US009288675B2

(12) United States Patent
Puregger

(10) Patent No.: US 9,288,675 B2
(45) Date of Patent: Mar. 15, 2016

(54) METHOD AND SYSTEM FOR PROVIDING A DISTRIBUTED WIRELESS NETWORK SERVICE

(75) Inventor: Alexander Puregger, Madrid (ES)

(73) Assignee: FON WIRELESS LIMITED (GB)

(*) Notice: Subject to any disclaimer, the term of this patent is extended or adjusted under 35 U.S.C. 154(b) by 210 days.

(21) Appl. No.: 14/004,875

(22) PCT Filed: Mar. 12, 2011

(86) PCT No.: PCT/EP2011/001224
§ 371 (c)(1),
(2), (4) Date: Sep. 13, 2013

(87) PCT Pub. No.: WO2012/122995
PCT Pub. Date: Sep. 20, 2012

(65) Prior Publication Data
US 2014/0010225 A1 Jan. 9, 2014

(51) Int. Cl.
H04W 4/00 (2009.01)
H04W 12/08 (2009.01)
H04W 12/06 (2009.01)
H04W 88/08 (2009.01)
H04W 76/02 (2009.01)

(52) U.S. Cl.
CPC .............. *H04W 12/08* (2013.01); *H04W 12/06* (2013.01); *H04W 76/022* (2013.01); *H04W 88/08* (2013.01)

(58) Field of Classification Search
CPC ..... H04W 12/08; H04W 12/06; H04W 88/08; H04W 76/022
See application file for complete search history.

(56) References Cited

U.S. PATENT DOCUMENTS 8,577,334 B1* 11/2013 Smith et al. .................. 455/410
2006/0274743 A1* 12/2006 Yegin et al. ................... 370/389
2007/0242657 A1* 10/2007 Waisman-Diamond ...... 370/352
2012/0240204 A1* 9/2012 Bhatnagar et al. ................. 726/5
2013/0205380 A1* 8/2013 Avni et al. .......................... 726/7
2014/0010225 A1* 1/2014 Puregger ....................... 370/338
2015/0074540 A1* 3/2015 Moritomo ...................... 715/739

FOREIGN PATENT DOCUMENTS

JP 2005-191721 7/2005 ............ H04L 12/28
JP 2009-182564 8/2009 ............ H04W 84/12

OTHER PUBLICATIONS

Japanese Office Action issued in corresponding Japanese Patent Appln. No. 2013-558308, dated Sep. 24, 2014, with English translation (9 pgs).
PCT International Preliminary Report on Patentability issued in corresponding application No. PCT/EP2011/001224, dated Sep. 26, 2013 (8 pgs).
PCT International Search Report and Written Opinion issued in corresponding application No. PCT/EP2011/001224, dated Oct. 6, 2011 (12 pgs).
Singh, J. P., "Authentication on the Edge: Distributed Authentication for a Global Open Wi-Fi Network," Internet Citation, Jul. 19, 2007, pp. 1-12, retrieved from the Internet: URL:http://www.standford.edu/{jatinder/publications/year/2007/mobicom2007.pdf (12 pgs).

* cited by examiner

Primary Examiner — Robert Wilson
(74) Attorney, Agent, or Firm — Hayes Soloway P.C.

(57) ABSTRACT

A distributed wireless network system includes a mobile unit capable of communicating over a Wi-Fi connection, a server that is coupled to and accessible over a global communication network, a first and a second Wi-Fi access point. The mobile unit and the first Wi-Fi access point are operated by a first user and the second Wi-Fi access point is operated by a second user. The server is configured to store user data of at least the first and the second user. The user data includes at least personal authenticity data of the user being allocated to a user login and a database of shared Wi-Fi access points. Upon transmission of identification data, the user login of the first user is transmitted to the server. It is then checked whether for this user login corresponding user data is stored at the server and whether the second Wi-Fi access point is in the list of shared Wi-Fi access points. If the checks are successful, access data from the server is transmitted to the mobile unit.

13 Claims, 5 Drawing Sheets

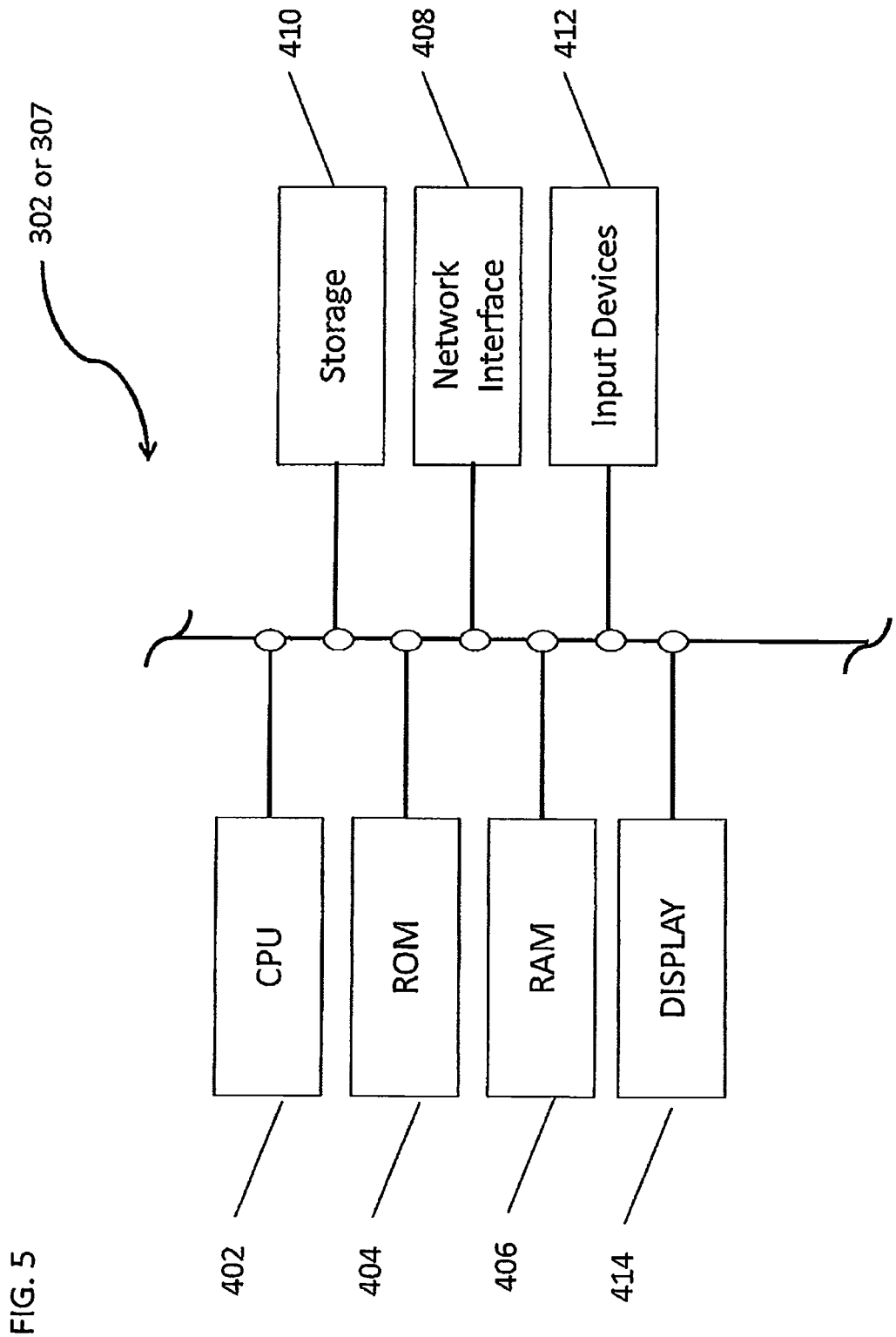

METHOD AND SYSTEM FOR PROVIDING A DISTRIBUTED WIRELESS NETWORK SERVICE

FIELD OF INVENTION

The invention relates to a method, a system, a mobile unit and a server for providing a distributed wireless network service.

BACKGROUND OF RELATED ART

Wireless Networks enjoy a high popularity as an attractive tool for people to access the Internet. This way of accessing the internet is continuously gaining popularity mainly due to the wide spread and increasing usage of wireless equipped modern customer equipment such as mobile phones, smartphones, laptops, netbooks, tablet computers, game consoles, digital cameras, printers, digital video cameras, digital music players, etc. These modern devices access the Internet by help of a variety of different wireless networks and network classes.

A first exemplary class are those networks operating in licensed frequencies. These networks are generally operated using technologies such as Global System For Mobile Communication (commonly known as GSM), WCDMA (commonly known as 3G), WiMax and LTE (both commonly referred to as 4G). An organization wishing to deploy and operate customer equipment using these frequencies needs to obtain a license from a competent authority (typically the telecom regulator) in the geography in which they wish to operate. These technologies are typically suitable for deployment of a data service over larger geographic areas and are generally operated and owned by companies as public Wide Area Networks (WAN's) with users paying for access. However, these networks have a relatively slow data transmission speed.

A second exemplary class of wireless network are those operating in unlicensed frequencies. These classes of networks are generally operated using technologies such as those specified in IEEE 802.11 standard (commonly known as Wi-Fi) or in Bluetooth. The owner of customer equipment operating in the respective frequencies being specified in these standards does not need to obtain a license for its use as long as the equipment is in conformity with the specifications. These technologies are typically suitable for networking over a smaller geographic area. As a result, unlicensed wireless networks have found popularity as a way for private persons and companies to extend their existing fixed line Local Area Network (LAN) and Internet connection creating a Wireless Local Area Network (WLAN). These networks are typically privately owned and operate within a single geographic footprint, typically a company's offices or a private residence. These WLAN networks have relatively high data transmission speeds. Once the owner of a WLAN has purchased the networking equipment they typically do not need to pay for the use of the wireless network anymore. The only remaining expenses are those for maintaining the fixed line Internet connection to the WLAN.

In a typical WLAN installation based on Wi-Fi, a residential or business user maintains an active Internet connection, thereby providing the bandwidth needed for wireless Internet connectivity. Although simple dial-up connections to the Internet may function to provide wireless connectivity, a high-speed internet connection, e.g. via a digital subscriber line (DSL), cable television service, T1-line or the like, is preferable.

In addition, a combination of hardware and software is installed for providing WLAN connectivity. E.g. computers or computing device(s) are supplied with Wi-Fi adapter(s) that are essentially low powered radio devices. Commonly, a WLAN router that provides an access point (also referred to as a gateway or access point) are applied, wherein the WLAN router manages the communication among the connected devices, e.g. further computers or notebooks and further provides a connection to the Internet for these devices. The connected computers or mobile devices and the gateway typically require a configuration to provide its functionality. Once properly configured, the mobile devices and computing devices equipped with Wi-Fi adapters can access the Internet without the need for a hardwire connection.

FIG. 1 illustrates a typical prior art Wi-Fi based WLAN network scenario, wherein a plurality of devices are configured to transmit and/or receive data while communicating with the Internet via a WLAN.

FIG. 1 exemplarily shows a plurality of mobile devices 101A to 101E, e.g. a laptop computer 101A, a tablet computer 101B, a smart phone 101C, a digital camera 101D and a digital media player 101E. Each device is suitably equipped to connect to the Wi-Fi WLAN including both, networking software and suitable hardware, i.e. a radio transmitter/receiver typically compatible with the IEEE 802.11 standards. Each of the mobile devices 101A to 101E communicates with an access point 102 using radio-based communication in compliance with the IEEE 802.11 standards 103. As a part of these standards, the access point 102 broadcasts a unique identifier as identification data, typically known as the SSID. This allows each mobile unit 101A to 101E to identify the access point 102 and to connect to a preferred access point 102 in case there is a plurality of access points 102 within the transmitting range of the respective mobile unit 101A to 101E.

The access point 102 is connected via a cable to a router 104 which provides the core switching and routing functionality for the WLAN network. Optionally, the router 104 is connected to further computer units 108, for example a personal computer using wired connections. The router 104 enables the wirelessly connected mobile units 101A to 1010E both, to communicate with each other and to communicate with the further computer units 108.

In order to provide Internet connectivity to the mobile units 101A to 101E—communicating via the WLAN—as well as to the computer units 108, the router 104 is connected to a modem 105, preferably via a cable link. The modem 105 in turn is connected to the network of an Internet Service Provider (ISP) 106 that is further connected to a global communications network, typically the Internet 107.

In some configurations, the access point 102, the router 104 and the modem 105 may be discrete hardware units. In other implementations, a combination of more than one of the access point 102, the router 104 and the modem 105 may be implemented into a single hardware device. Typically, a combined router 104 and modem 105 is provided.

An operator of a Wi-Fi network typically has the choice between two modes of operation with regards to authenticating of the mobile units 101A to 101E if they connect to the access point 102.

First, an unencrypted mode of operation may be selected. The operator configures the access point 102 to communicate using an unencrypted signal. In this mode, the access point 102 broadcasts the SSID to any suitably equipped mobile unit 101A to 101E that in turn may freely establish a wireless connection to the access point 102.

According to a second option, an encrypted mode is applied for wireless communication. In this encrypted mode, the operator configures the access point 102 to communicate with the mobile units 101A to 101E using an encrypted signal. In this mode of operation the access point 102 still broadcasts the SSID unencrypted but for establishing a connection to the access point 102, the mobile unit 101A to 101E must provide a password that has been set by the operator of the WLAN network. A mobile unit 101A to 101E that is not able to provide the correct password is not able to establish a connection with access point 102. Once the password is successfully presented to the Wi-Fi access point, the connection to the mobile unit 101A to 101E is encrypted. A number of suitable protocols are commonly used for communicating and authenticating the password and for encrypting the communication. Suitable encryption technologies are e.g. WEP or WPA.

Each mode of operation has several advantages and disadvantages. The unencrypted mode of operating the network access point 102 maximises the utility of the WLAN access point and will allow a maximum number of mobile units 101A to 101E to be able to access the resources provided by the Wi-Fi access point including access to the Internet 107. However, this mode of operation creates a security problem since the operator is unable to control which mobile unit 101A to 101E accesses the network resources. Thus a malicious user of a mobile unit 101A to 101E may be able to gain access to mobile units 101A to 101E, to computer units 108 and to the Internet 107 as well. This access may be used for malicious or criminal purposes. For example, credit card details being stored on computer units 108 may be spied out or the Internet 107 may be applied for illegal download of copyrighted music files.

The Encrypted mode of operation may resolve some of the problems of the unencrypted mode. The operator of the access point 102 can set a password and distribute the password to trusted parties only. As a result, access to further mobile units 101A to 101E, to computer units 108 and to the Internet 107 is restricted to trusted third parties. However, there are mainly two disadvantages when operating the access points 102 in this mode. First, the service of the WLAN network is reduced. Access to its resources is denied for any mobile unit 101A to 101E that is not able to present the right password. Even for non malicious users, access may be denied. Second, there is no guarantee to the operator/owner of the access point 102 that a party to whom he or she has provided the password does not intentionally or otherwise communicate the password to a malicious third party and thereby violates the security provided by the password.

Both modes of operation have further security problems in common. E.g., they don't validate which mobile unit 101A to 101E is connected to the access point 102. In other words, the mobile unit 101A to 101E is not identified. The encrypted mode denies access without having a password, however, it does not differentiate between each of the mobile units 101A to 101E. This has implications on the network's security. The Internet service provider (ISP) 106 typically allocates a single IP-address to the modem 105 and the WLAN network operates as a private subnet. As a result, the ISP 106 is not capable of differentiating between communications traffic from different mobile units 101 or from the computer unit 108. The ISP will only be able to identify all traffic as relating to modem 105. If the user of a mobile unit 101A to 101E uses the Internet 107 for criminal purposes, from the perspective of the ISP 106, the illegal traffic will have originated from the private subnet of modem 105. Since the encrypted mode does not differentiate between the mobile units 101A to 101E, even the operator of the WLAN network is not able to identify the malicious user. In much legislation the operator of the modem 105 can be held legally responsible for the malicious use of the connection provided by the ISP 106.

Despite the aforementioned shortcomings, the use of the encrypted mode of operation has become increasingly popular. As a result, a user of a mobile unit 101A to 101E will typically utilise a small number of encrypted WLAN networks only, e.g. at home or at work. In places between these two locations, whilst the mobile unit 101A to 101E may be within the transmitting range of further WLAN networks, the mobile unit will have no network access since the user will generally not have the necessary passwords required for accessing the further WLAN networks. As a result the mobile unit 101A to 101E will not be able to access the resources of those WLAN networks and will have access to the Internet 108 using a wide area network (WAN) such as 3G only, if the mobile unit is suitably equipped. If there is no WAN present or if the mobile unit is not suitably equipped, it won't be able to connect to the Internet at all. The WAN network typically provides a lower data rate with resultant lower utility of the mobile unit 101A to 101E and will further incur access fees.

As a result and in order to maximise both, the utility of the mobile unit 101A to 101E and to reduce access charges, it is desirable to allow mobile units to access a larger number of the available WLAN networks. However, for this purpose, the mobile unit has to store a plurality of passwords to be capable of connecting to a larger number of WLAN networks.

There are several approaches known in the prior art that would allow a user of a mobile unit 101A to 101E to access a larger number of WLAN networks without the inherent weaknesses of using an unencrypted network.

According to a prior art solution the operators of Wi-Fi based WLAN networks share the passwords of their access points 102. The operator of the access point 102 provides the password and the SSID of the access point 102 to other users of mobile units 101A to 101E via a database. A copy of this database is stored in each of the mobile units 101A to 101E. If the mobile unit 101A to 101E attempts to connect to an encrypted access point 102, it searches the copy of the database and if a password is found for the respective SSID of the access point 102, it uses the respective password to establish a connection to the access point. However, this approach has a number of drawbacks. First, since the mobile unit 101A to 101E stores the SSIDs and access passwords for a plurality of access points, there is a risk that the respective access information will be misused by a malicious user. Second, this technical approach does not solve the problem of differentiating between the different mobile units 101A to 101E, i.e. identifying them and the operator of the WLAN network may be still exposed to a legal threat of malicious use of the Internet 107. Third, the solution does not prevent access to the computer units 108 by a malicious user of a mobile unit 101A to 101E.

SUMMARY OF INVENTION

It is an object of the invention to provide a method, mobile unit, a server and a system for providing a distributed wireless network system that is improved with respect to network security.

In an aspect of the invention, a method for providing a wireless network service via a distributed network system is provided. The network system comprises at least a mobile unit capable of communicating over a Wi-Fi connection, a server that is coupled to and accessible over a global communication network, a first and a second Wi-Fi access point. The mobile unit and the first Wi-Fi access point are operated by a first user while the second Wi-Fi access point is operated by a second user. The server is configured to store user data of at least the first and the second user. The user data comprises personal authenticity data of the user, i.e. at least of the first and second user, and wherein the authenticity data of the users is allocated to a respective user login.

The server may further comprise a database of shared Wi-Fi access points. The database may comprise identification data of registered Wi-Fi access points and corresponding access data allowing an encrypted wireless connection to the respective Wi-Fi access points. The list of shared Wi-Fi access points that is stored at the server comprises at least identification data and access data for the Wi-Fi access points being operated by the first and second user.

Advantageously, the availability of a wireless service provided by the second Wi-Fi access point may be detected. The availability of the second Wi-Fi access point can be detected by the mobile unit. The identification data may then be polled from the second Wi-Fi access point and transmitted to the server. These two steps are preferably performed by the mobile unit too. Further, upon transmission of the identification data, the mobile unit transmits the user login of the first user to the server.

According to an aspect of the invention, it can be checked whether for this user a corresponding user login is stored at the server and it is further checked whether the second Wi-Fi access point is in the list of shared Wi-Fi access points. These steps are preferably performed by the server. If these two checks are successful, access data is transmitted from the server to the mobile unit. Further, the mobile unit then uses this access data to connect to the second Wi-Fi access point.

Advantageously, the invention enables the owners/users of existing encrypted Wi-Fi access points to participate in a distributed wireless network in which they share the use of their existing broadband Internet connections. However, the security problems known in the prior art are overcome.

The owner of a Wi-Fi access point is typically provided with software that can be downloaded from a server. The server can be connected to a global communications network such as the Internet. Preferably, this software application configures the mobile unit to store personal details of the owner of the Wi-Fi access point, for example a user of the Wi-Fi access point and thereby allows an authentication of the user. Suitable personal authentication data may be, for example a name and/or address and/or a phone number of the user. A unique user account is preferably created and the personal authentication data is allocated to a user login. A database of shared Wi-Fi access points may advantageously be created at the server and in this way a database of SSIDs and corresponding passwords of Wi-Fi access points is automatically built up by the server.

In an aspect of the invention, the user can download the software application on multiple mobile units in order to provide these with the respective functionality as long as they are suitably configured to connect to Wi-Fi access points.

In another aspect of the invention, the software application can be preinstalled on the mobile unit. This simplifies the procedure for the user of the mobile device.

When the mobile unit is within range of a Wi-Fi access point having an SSID that has previously been stored with the server, then the mobile unit will use the password that is registered at the server to enable a wireless connection to the Wi-Fi access point. The mobile unit is then able to access the Internet through the existing Internet connection of the access point. Each registered access point forms part of a wider integrated network of access points. In this way the owners of a Wi-Fi access point share their access points and Internet connections and as a result they are able to use a number of further Wi-Fi access points of other owners. The connectivity and utility of the mobile unit is thus significantly improved.

The method allows a mobile unit to connect to a number of Wi-Fi access points without creating the inherent security risks of permanently storing the access data in the mobile unit.

In a preferred embodiment, the mobile unit will identify a Wi-Fi access point that has previously been registered at the server and then download the password from the server. This enables the owners of existing Wi-Fi access points to share access to their existing broadband Internet connections to the users of mobile units without compromising the network security.

In another aspect of the invention, a server is configured to store a database comprising user data further having unique identification data of mobile units operated by the respective users. The identification of the mobile units is performed by storing, for example a hardware code. This measure improves the security of the shared Wi-Fi connection. The owner of a Wi-Fi access point may—in case of a malicious user—identify the respective mobile unit of the same.

According to a preferred embodiment, the access data is transmitted from the server to the mobile unit using an encrypted connection. This prevents a potential malicious user from finding out the respective password, e.g. be listening to a transmission thereof to another user.

Preferably, the access data is transmitted, at least partly, via a third party network that is coupled to and accessible over the global communication network, e.g. via a 3G or 4G network. Once the connection has been established, the password will preferably be deleted from the mobile unit. Advantageously and according to another aspect of the invention, the password will neither be available nor will it be accessible to the user of the mobile unit.

In another aspect of the invention, upon connection between the mobile unit and the second Wi-Fi access point, a tunnelling protocol based virtual private network (VPN) connection between the mobile unit and server via the second Wi-Fi access point may be established. The VPN connection prohibits access from the mobile unit to further participants being connected to the second Wi-Fi access point.

Advantageously, a mobile unit being connected to the access point will only be able to communicate with the server and will be able to access the Internet. However, it cannot communicate with other mobile units being linked to the Wi-Fi access point. Further, there will be no access of other computing units (for example PCs) which are connected to the router to which the access point is connected.

According to this aspect, the owners of existing Wi-Fi access points may share access to their existing broadband Internet connections to users of mobile units without the risk of being held liable for a malicious usage by one of the users. The Wi-Fi access points may be shared without compromising the security of further users of the access point.

In a preferred embodiment, all Internet directed communication from the mobile units will be channeled through the server. The server will record details of all communication through the VPN connection/tunnel and will further store details of the mobile units maintaining the connection. This improves the security for the owners sharing their Wi-Fi access points.

In addition, the mobile unit will require authentication by the user, e.g. with a user name and password. In this way, both, the details of the mobile unit and its user can be identified for each connection to the access point thereby enabling legal deniability for the owner of the access point in the event of malicious use.

According to another embodiment, access data of Wi-Fi access points that has been previously stored in the mobile unit can be added to the database of shared Wi-Fi access points stored on the server. This is advantageous if the access data relates to access points to which the mobile unit was previously connected and which are not yet contained in the database at the server. Preferably, the step of adding the additional access data of further Wi-Fi access points is executed upon confirmation by the user. Exemplarily, the SSID and a password of each of the access points is then be added to the list. This aspect allows a fast growth of the shared network while the safety for each individual user or owner of a Wi-Fi access point will be upheld.

According to an aspect of the invention, identification data of access points may be downloaded and cached in the mobile units based on geo-location data. A specific pre-selection of available access points may be made based on the location of the mobile unit. Identification data of various available access points within a specific limited area or at certain location may be stored in the mobile unit. The amount of data may advantageously be limited in accordance with the geo-location (physical location on earth, for example in a country, city or part of the city, street, building or even a part of a building or other facility). The location can be determined through the service provider and technology used by the mobile unit (GMS, G3, G4, or other wireless networks etc.) or even by GPS or the like. The list of identification data of a plurality of access points may include a prioritization of specific access points. This can improve the connectivity and the data transmission (traffic) within specific areas or for specific access points.

In an aspect of the invention, the bandwidth for data transmission (through the second Wi-Fi access point) available to the first user using the mobile unit that is connected to the second Wi-Fi access point may be regulated and prioritized by an operator.

Furthermore, the bandwidth available to the second user using the second Wi-Fi (and through the second Wi-Fi access point) access point may also be regulated and prioritized by an operator (service provider).

In one embodiment of the invention, this regulation or prioritization may merely be performed by the server by which the VPN data transmission and traffic is administrated and/or controlled.

In another embodiment, the regulation or prioritization of bandwidth for the first and second user may be performed by software installed on the mobile unit in interaction/communication with the server.

The available bandwidth for data transmission may be prioritized and/or regulated for the first user between the mobile unit and the server and/or between the mobile unit and the global communication network (Internet). The available bandwidth for data transmission may be prioritized and/or regulated for the second user between the second Wi-Fi access point and the server and/or between the server and the global communication network (Internet).

In an embodiment, the prioritization or regulation of the available bandwidth may be performed according to the following criteria. The second user may generally have a higher priority and therefore more bandwidth than the first user. Alternatively, the user providing the higher share of bandwidth to other users at the Wi-Fi access point has higher priority and/or higher bandwidth at Wi-Fi.

In another aspect of the invention, a distributed system for providing a wireless network service is provided. The system can comprise a mobile unit capable of communicating over a Wi-Fi connection, a server that is coupled to and accessible over a global communication network, and a first and a second Wi-Fi access point.

The mobile unit and the first Wi-Fi access point are operated by a first user and the second Wi-Fi access point is operated by a second user. The server is configured to store user data of at least the first and the second user. The user data may comprise personal authenticity data being allocated to a user login. The server may then be configured to store a database (list) of shared Wi-Fi access points. This list or database may comprise identification data of registered Wi-Fi access points and corresponding access data, e.g. a password, allowing an encrypted wireless connection to the respective Wi-Fi access points. The database or list of shared Wi-Fi access points may comprise at least identification data and access data for Wi-Fi access points being operated by the first and second user.

Further, the mobile unit can be configured to detect the availability of a wireless service provided by the second Wi-Fi access point, to poll identification data from the same and to transmit this identification data to the server. Upon transmission of the identification data the user login of the first user can be transmitted to the server.

The server can then be configured to check whether for this user login corresponding user data is stored at the server, and to check whether the second Wi-Fi access point is in the list of shared Wi-Fi access points. If these checks are successful, access data is transmitted to the mobile unit.

The invention also provides a mobile unit that is operated by a first user. The mobile unit may then be configured to communicate over a Wi-Fi connection with a server that is coupled to and accessible over a global communication network. The mobile unit being may further be configured to detect the availability of a wireless service provided by the second Wi-Fi access point. The mobile unit may further be adapted to poll identification data from the second Wi-Fi access point, transmit this identification data to the server and transmit the user login of the first user to the server. Upon transmission of the identification data, the mobile unit may receive access data from the server, and connect to the second Wi-Fi access point using the access data transmitted from the server.

The invention further provides a server coupled to and accessible over a global communication network for providing a wireless network service for a mobile unit configured to communicate over a Wi-Fi connection. The mobile unit and a first Wi-Fi access point can then be operated by a first user. A second Wi-Fi access point can be operated by a second user. The server may be configured to store user data of at least the first and the second user. The user data may comprise personal authenticity data being allocated to a user login. The server may further be configured to store a database of shared Wi-Fi access points. The database can comprise identification data of registered Wi-Fi access points and corresponding access data allowing an encrypted wireless connection to the respective Wi-Fi access points. The database of shared Wi-Fi access points can comprise at least identification data and access data for Wi-Fi access points being operated by the first and second user. The server can be adapted to receive identification data of the second Wi-Fi access point from the mobile unit, receive the user login of the first user from the mobile unit upon transmission of the identification data, check whether for this user login corresponding user data is stored at the server, and to check whether the second Wi-Fi access point is in the list of shared Wi-Fi access points. If the checks in feature are successful, the server transmits access data for the second Wi-Fi access point to the mobile unit.

Same or similar advantages that have already been mentioned for the method according to aspects of the invention will also apply to the system, the mobile unit or the server according to the invention.

BRIEF DESCRIPTION OF DRAWINGS

Further aspects and characteristics of the invention will ensue from the following description of preferred embodiments of the invention with reference to the accompanying drawings, wherein

FIG. 5 illustrates functional elements of a mobile unit and servers connectable to a distributed system for providing a wireless network service according to an embodiment of the invention.

DETAILED DESCRIPTION OF PREFERRED EMBODIMENTS

Figure 1:
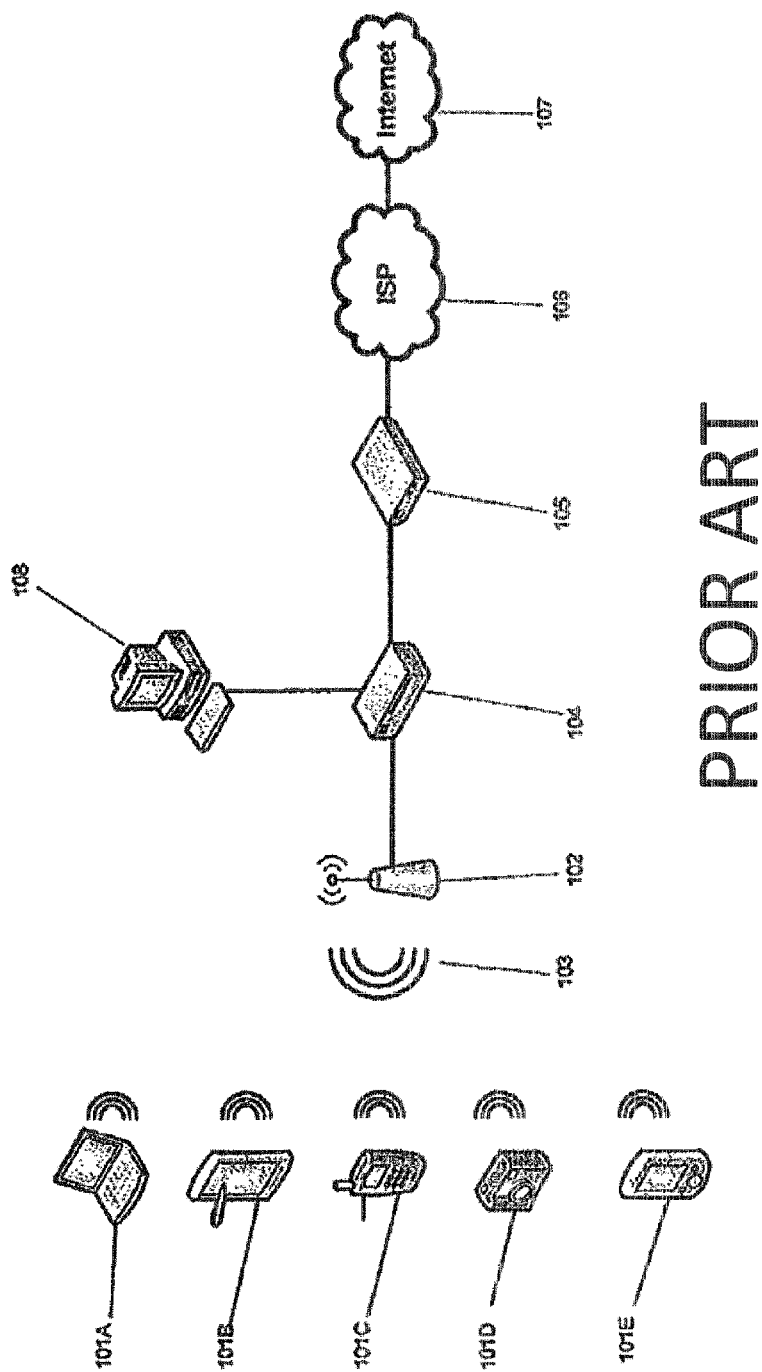
FIG. 1 is a schematic illustration of a typical prior art Wi-Fi based WLAN network providing a network service to a plurality of mobile units configured to transmit and/or receive information including communicating with the Internet.
Figure 2:
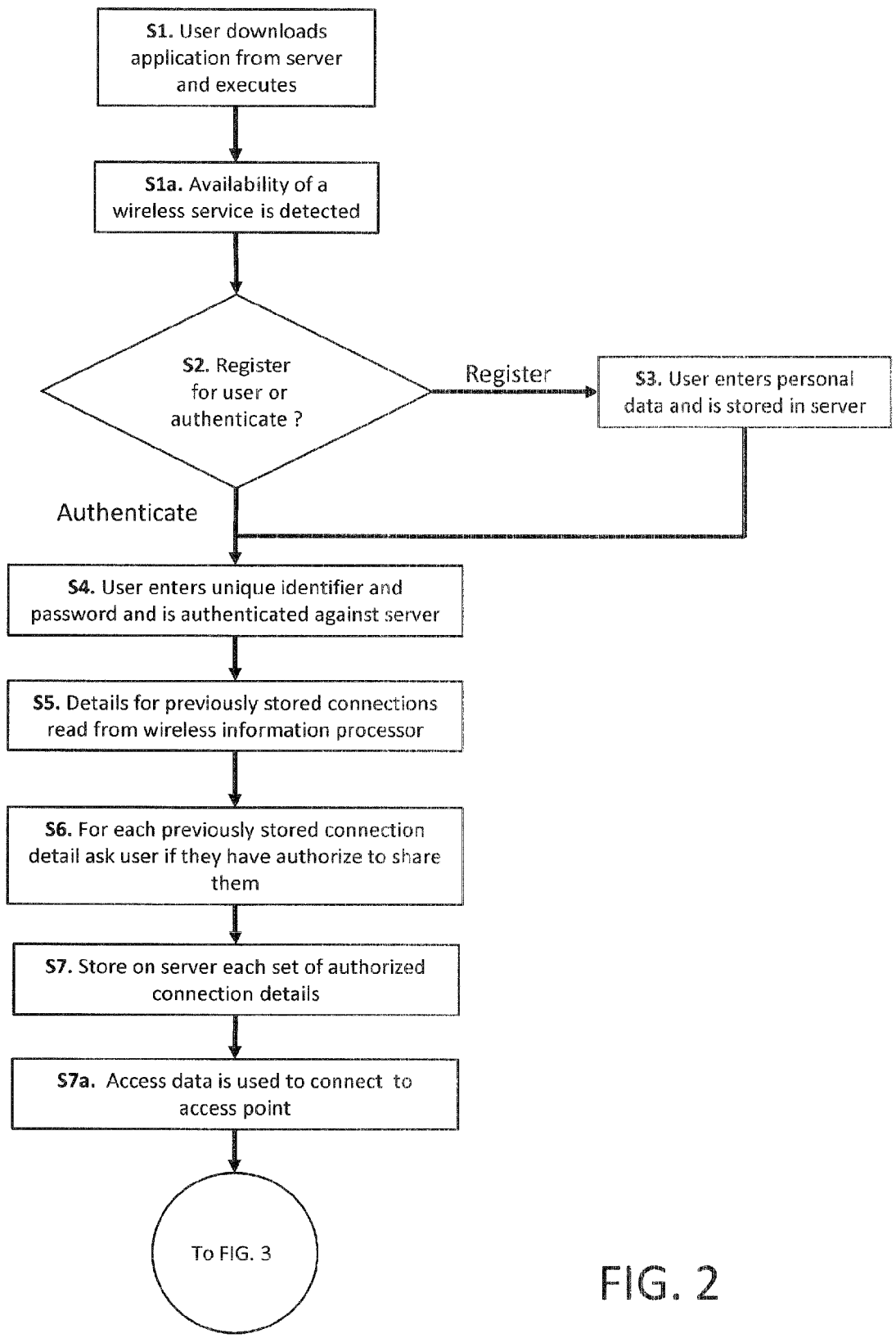
FIGS. 2 and 3 show a flow chart according to an embodiment of the invention.

FIG. 2 is a flow chart illustration a method for providing a distributed wireless network service according to an embodiment of the invention.

In a first step S1, the owner/user of a Wi-fi access point further operating a mobile device downloads a software application from a server to one or more of his or her wireless mobile units. In an embodiment, the software may not be downloaded but pre-installed on the mobile units. This software application configures the mobile unit(s) for the following steps that will be executed for each of the mobile units to which the software has been downloaded, However, the method according to the embodiment will be explained by making reference to a single mobile device only, without limiting the scope of the invention to a single mobile unit. The aspects of the invention equally apply and a plurality of mobile units and access points. At the next step S1a, the availability of a wireless service provided by the second Wi-Fi access point may be detected.

In a second step S2, upon execution of the application, the mobile unit, e.g. a Notebook or Smartphone, will prompt to the user of the mobile unit to either register to use the network, or, if the user has previously registered, to enter a unique user account identifier and a password.

If the users enter their credentials, such as a login and a password, these are authenticated with the server in step S4. If the user elects to register, he or she will enter personal details in step S3 including, for example their email address, which is used as a unique identifier for their account, contact details and a password. The owner must provide information that can be used to uniquely confirm his or her identity in compliance with legal requirements. In some embodiments, this information could include credit card details or a mobile phone number of the owner. In the latter case the mobile phone number may be validated by the server by sending a Short Message Service (SMS) message to confirm the mobile phone number. This message may contain a unique code which the owner would enter into the mobile unit. Personal details for the owner are stored at the server.

In an embodiment, in step S5 the mobile unit then reads the connection details including but not necessarily limited to the SSID and a password for each encrypted Wi-Fi access point previously stored in the mobile unit. For each previously stored connection, the mobile unit will preferably prompt the user and ask whether the respective connection shall be authorised and shared (step S6). In the case when the user is be able to confirm that all respective connections may be shared an individual confirmation of each connection will not be required. If the user confirms that the respective connection is authorised, connection details for each particular access point, along with details of both, a unique user identifier of the user that confirmed the authorisation and information regarding the mobile unit e.g. a MAC code is stored at the server in step S7. At step S7a the mobile unit then uses this access data to connect to the second Wi-Fi access point.

Figure 3:
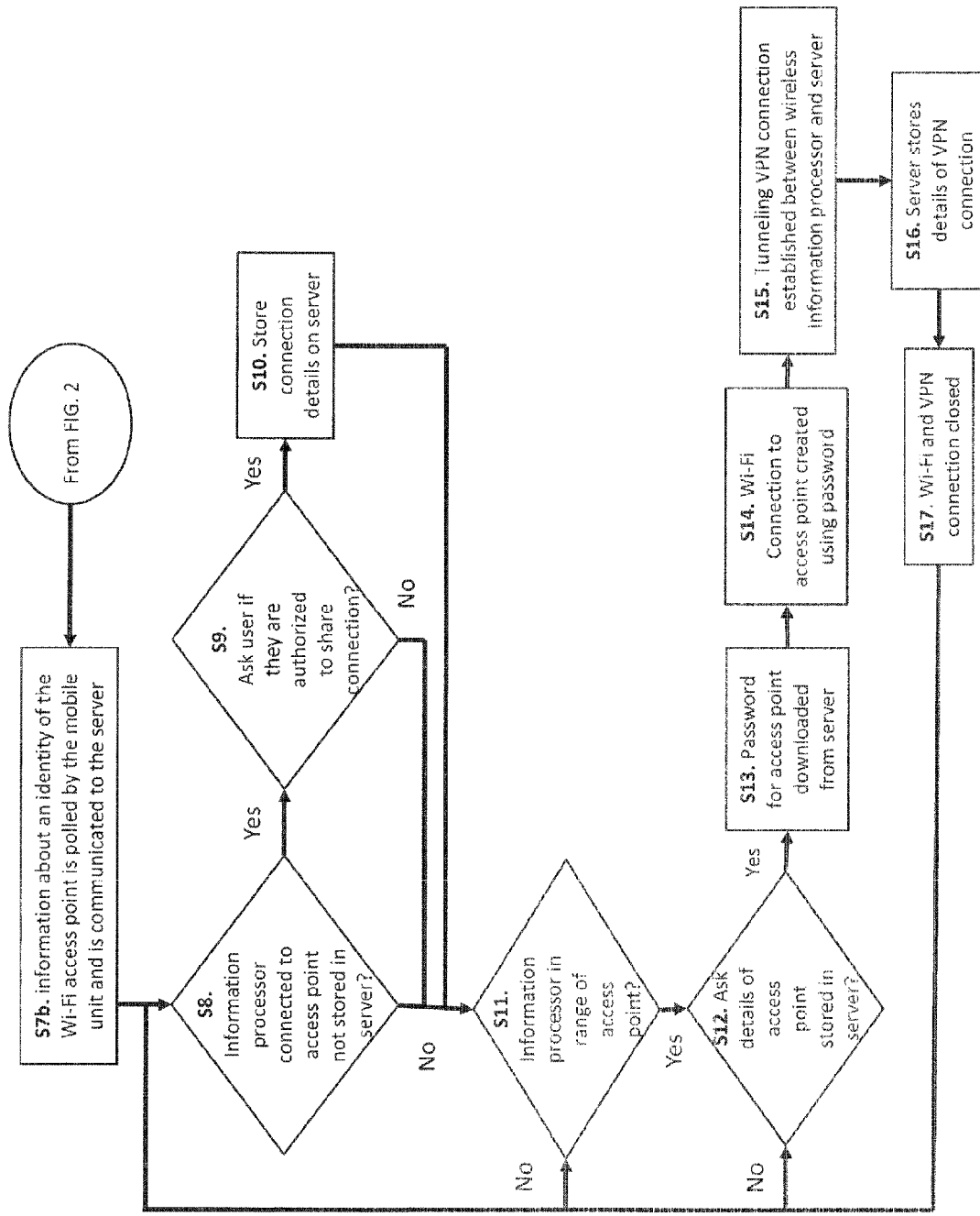

Further steps of the method according to embodiments of the invention will be explained by making reference to FIG. 3.

Upon connection to a wireless service provided by a Wi-Fi access point, information about an identity of the Wi-Fi access point is polled by the mobile unit and is communicated to the server at step S7b. This communication may optionally take place using a non-Wi-Fi based third party wide area network such as a 3G or 4G network.

If the respective Wi-Fi access point is not present in the list or database of shared access points that is stored at the server (see step S8), the mobile unit will ask the user if he or she is capable of authorising the respective access point as a shared access point (see step S9). If the user confirms this and further has the permission to share the Wi-Fi access point, the connection details, for example the SSID and a password are also stored in the database of shared access points at the server. Further, details of the both, the unique user identifier, e.g. a password of the user that confirmed the authorisation and information regarding the mobile unit, e.g. the MAC code are stored at the server in step S10. This allows an identification of the user who has authorised the added Wi-Fi access point as a shared access point.

Upon movement of the mobile unit, the same will detect or enter a transmitting range of a further access point (see step S11). The mobile unit will query the server over a preferably non Wi-Fi based third party network such as a 3G or 4G network to confirm if the SSID of this access point is stored in the database or list of shared access points in server (see step S12). According to an embodiment, all or a portion of the SSIDs stored at the server's list may be cached by the mobile unit so as to minimise the need to query the server over the third party network.

According to an embodiment, optionally geo-location capabilities of the mobile unit for example Global Positioning System (GPS), may be used to identify the location of the mobile unit and cache in the mobile unit the access details for access points in the geographic proximity of the mobile unit.

If the SSID of the Wi-Fi access points in question has been previously stored with the server, the mobile unit downloads the password for that particular access point from the server in step S13. This download is preferably performed using the third party non Wi-Fi network too. Preferably, the communication between the server and the mobile unit is encrypted. Whilst the password may be temporarily stored in the mobile unit, the user of the same will not be able to read or access details of the password in any way. The mobile unit uses the password to connect to the access point and then deletes the password from its storage (see step S14). According to an aspect, the password may be cached within the mobile unit for a predetermined period of time in order not to place undue load on the third party network connection of repeatedly requesting the same access details from the server.

After the connection has been established, the mobile unit establishes a tunnelling protocol based VPN connection to the server in step S15. All network traffic to and from the mobile unit is routed through this VPN tunnel. This includes traffic to and from the Internet. The VPN tunnel is configured in that the mobile unit is neither able to communicate with any other mobile unit being connected to the respective access point nor is the mobile unit able to connected to the other computing devices connected to the router that is connected to the access point.

Preferably, the server records parameters for each network connection from the mobile unit in step S16. These parameters may include the user name used for authentication of the user, the start and end time, i.e. the duration of the connection, network addresses accessed in the Internet, the network and MAC address of the mobile unit.

If the mobile unit loses its connection to the access point, e.g. due to movement beyond the transmission range or if the owner manually selects to disconnect the access point, the mobile unit closes the VPN connection and the Wi-Fi connection to the access point in step S17.

If upon identification of the Wi-Fi access point and communication of the identity to the server, the access point cannot be found in the list of shared access points (see step 12), the method returns to the procedure of adding the respective access point starting in step S8.

Figure 4:
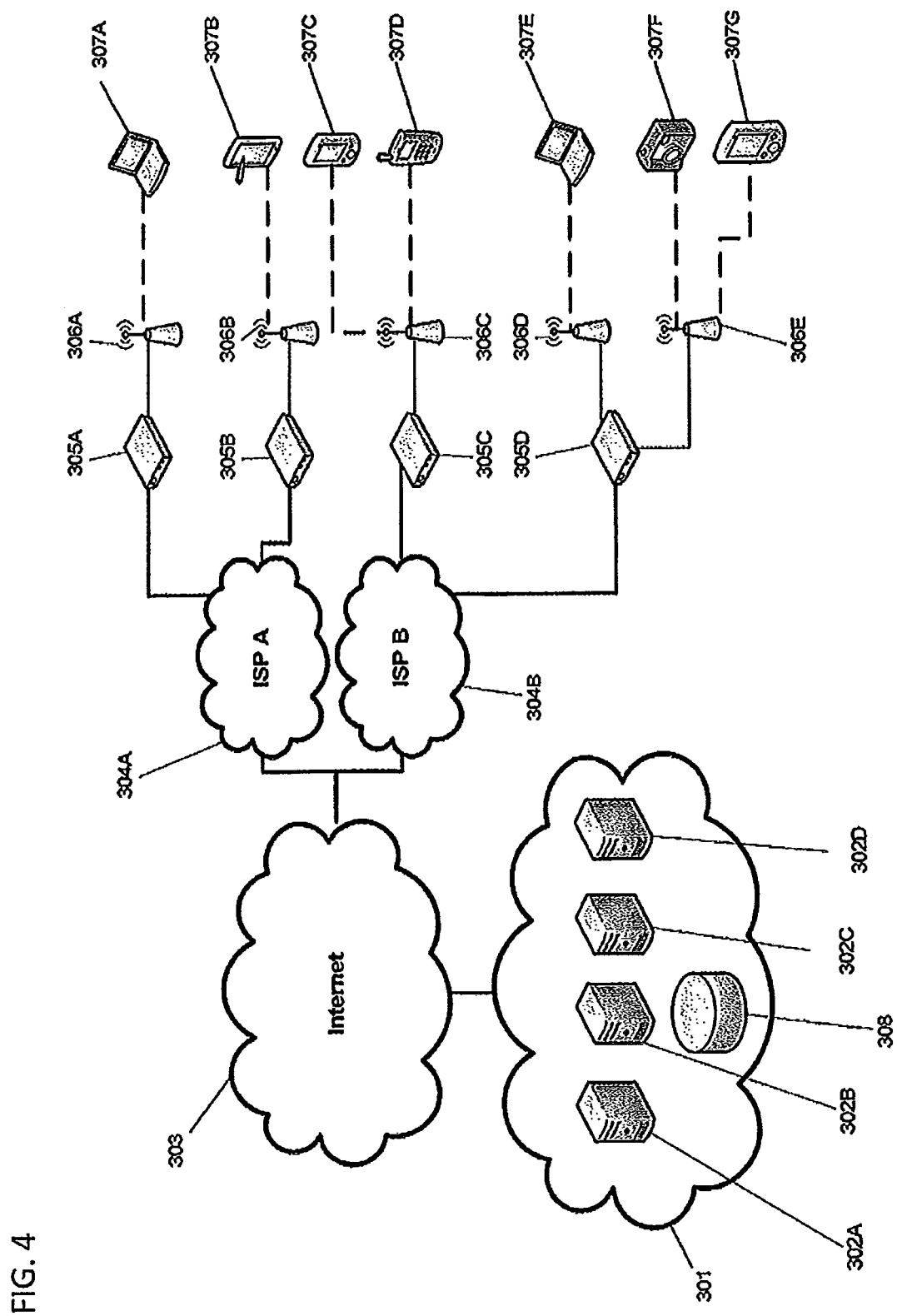
FIG. 4 is a block diagram illustrating a distributed system for providing a wireless network service according to an embodiment of the invention.

FIG. 4 is a block diagram illustrating a distributed system for providing a wireless network service according to an embodiment of the invention.

A proprietary network 301 containing a plurality of servers 302A-302D is connected to a global communications network 303, for example the Internet. It is possible that all of the functionality performed by servers 302A-302D may be performed by a single server 302.

The global communication network 303 in turn is connected to a plurality of Internet Service Providers networks (ISP A, ISP B) 304A-304B. Each Internet Service Provider network 304A-304B is connected to a plurality of router-modems 305A-305D. Each router-modem 305A-305D is connected to at least one but possibly more Wi-Fi access points 306A-306E. Each Wi-Fi access point 306A-306E is wirelessly connected using an encrypted Wi-Fi signal to a plurality of mobile units 307A-307G which are suitably equipped and configured to communicate using Wi-Fi.

The servers 302A-302D provide various functionalities in various contexts. For example, an information server 302A is operable as a hypertext transport protocol (HTTP) server. Server 302B is configured as a Remote Authentication Dial In User Service (RADIUS) to provide authorisation, authentication and accounting (AAA) services. Server 302C is configured as a Relational Database Server to operate the Database 308. Server 302D is configured as a L2TP VPN server and LNS router.

Server 302A operates as an Internet web server that is operable to access a database 308 preferably stored in server 302B. Database 308 stores information regarding the end users of the mobile units 307A to 307G. The database 308 comprises connection details (including SSID and password) of Wi-Fi access points 306, network usage statistics of the VPN and the like. Also information entered by the users of the mobile units 307A to 307G (e.g. user credentials, see step S4 in FIG. 2) used for authentication is stored in the database 308.

Preferably, the mobile units 307A to 307G communicate via the communications protocol Transmission Control Protocol/Internet Protocol (TCP/IP). In this way, content can be transmitted to and from the mobile units 307A to 307G and commands can be executed to enable various functionalities.

A mobile unit 307A to 307G may be any device that are capable of sending and receiving data across global communication networks, e.g. mainframe computers, mini computers, personal computers, laptop computers, personal digital assistants (PDA), smart phones, tablet computers, digital cameras, digital music players, video game consoles, digital video cameras and internet access devices such as Web TV. A mobile unit can communicate over a network and can be operated anywhere including, e.g. in moving vehicles. In addition, mobile units are equipped and configured with hardware and software so as to be capable of communicating using Wi-Fi.

The functionality of the hardware units shown in the network of FIG. 4 may be implemented preferably at the mobile units 307A to 307G and the servers 302A to 302D using e.g. C, C++, Visual Basic, JAVA, PHP, HTML, XML ACTIVE SERVER PAGES, JAVA server pages, servlets, MICROSOFT.NET, and a plurality of various web site development applications.

The database at the server may be configured in a MICROSOFT EXCEL spread sheet file, as a comma delimited ASCII text file, as a MICROSOFT SQL server compatible table file or the like. Data may also be formatted as an image file (e.g. TIFF, JPG, BMP, GIF or the like) or may be stored in an ADOBE ACROBAT PDF file. Preferably, one of more data formatting and/or normalisation routines are provided that manage data received from one or a plurality of sources. In another embodiment, data is received that is provided in a particular format (e.g. MICROSOFT EXCEL) and a programming routines is executed that converts the data to another format (e.g. ASCII comma delimited text).

A suitable operating system for the mobile units 307A to 307G may be e.g. DOS, WINDOWS 3.X, WINDOWS 95, WINDOWS 98, WINDOWS NT, WINDOWS 2000, WINDOWS ME, WINDOWS CE, WINDOWS POCKET PC, WINDOWS MOBILE WINDOWS XP, WINDOWS 7, MAC OSX, IOS, UNIX, LINUX, ANDROID, SYMBIAN, PALM OS, POCKET PC or any other suitable operating system. Moreover, a plurality of data file types may be supported; preferably multi-media file types like JPEG, BMP, GIF, TIFF, MPEG, AVI, SWF, RAW etc.

FIG. 4 illustrates the functional elements of a mobile unit 307A to 307G and the servers 302A to 302D. It includes one or more central processing units (CPU) 402 used to execute software code and to control the operation of the mobile unit. Further, the mobile unit comprises a read-only memory (ROM) 404, a random access memory (RAM) 406, one or more network interfaces 408 (to transmit and receive data to and from other mobile units or computer units across a communication network), storage devices 410 such as hard disk drive, floppy disk drive, CD ROM or DVD for storing program code, databases and application data, one or more input devices 412 such as keyboard, mouse, track ball, magnetic card reading device, bar code reading device, touch screen, microphone or the like and a display 414.

The various components of the mobile device do not need to be physically contained within the same chassis or even located in a single location. E.g., the storage device 410 may be located at a site which is remote from the remaining elements and may even be connected to a CPU 402 across a communication network 303 via the network interface 408. The mobile units, computer units and servers preferably include a memory equipped with sufficient storage to provide the necessary databases, programs and other services as well as acting as a web server for communicating hypertext mark-up language (HTML), FLASH, Action Script, Java, Active Server Pages, Active-X control programs.

The bandwidth for data transmission (through Wi-Fi access points 306A to 306E) available to the users using the mobile units 307A to 307G may be regulated and prioritized by an operator (service provider). The bandwidth (through the second Wi-Fi access point) available to the owners and/or operators of the Wi-Fi access point may also be regulated and prioritized by an operator at proprietary network 301. In one embodiment of the invention, this regulation or prioritization may merely be performed by one or more of the servers, for example server 302D by which the VPN data transmission and traffic is administered and controlled. In another embodiment, the regulation or prioritization of bandwidth for the users may be performed by software that is pre-installed on the mobile units 307A to 307G in interaction/communication with one or more of the servers 302A to 302D.

The available bandwidth for data transmission may be prioritized and/or regulated for one user between the mobile unit 307A to 307G and the server 302D and/or between the mobile unit 307A to 307G and the global communication network 303 (Internet). The available bandwidth for data transmission may be prioritized and/or regulated for another user between the Wi-Fi access point(s) 306A to 306E and a server at site 301 and/or between a server 302A to 302D and the global communication network 303 (Internet).

The user owning and/or operating a Wi-Fi access point 306A to 306E may generally have a higher priority and therefore more bandwidth than another user. Alternatively, the user providing the higher share of bandwidth to other users at his or her Wi-Fi access point 306A to 306E may have higher priority and/or higher bandwidth at Wi-Fi. Other principles may also be used for assigning bandwidth to users.

Although the invention has been described hereinabove with reference to specific embodiments, it is not limited to these embodiments and no doubt further alternatives will occur to the skilled person that lie within the scope of the invention as claimed.

The invention claimed is:

1. A method for providing a distributed wireless network service via a distributed network system having at least a mobile unit capable of communicating over a Wi-Fi connection, a server that is coupled to and accessible over a global communication network, a first and a second Wi-Fi access point, wherein the mobile unit and the first Wi-Fi access point are operated by a first user and the second Wi-Fi access point is operated by a second user, wherein the server is configured to store: user data of at least the first and the second user, the user data comprising at least a personal authenticity data of the user being allocated to a user login, and a database of shared Wi-Fi access points, the database comprising at least: identification data of registered Wi-Fi access points and corresponding access data allowing an encrypted wireless connection to the respective Wi-Fi access points, wherein the database of shared Wi-Fi access points comprises at least identification data and access data for the Wi-Fi access points being operated by the first and second user, wherein the method for providing a distributed wireless network service via a distributed network system comprises the steps of:

a) detecting, with the mobile unit, the availability of a wireless service provided by the second Wi-Fi access point, polling identification data from the second Wi-Fi access point and transmitting the identification data to the server;

b) transmitting, with the mobile unit, the user login of the first user to the server upon transmission of the identification data;

c) checking, with the server, for this user login, whether corresponding user data is stored at the server; and d) checking, with the server, whether the second Wi-Fi access point is in the database of shared Wi-Fi access points; and if the checks in step c) and d) are successful, the following steps are performed:

e) transmitting access data from the server to the mobile unit, and f) connecting the mobile unit to the second Wi-Ti access point using the access data transmitted from the server.

2. The method according to claim 1, further comprising storing identification data of mobile units operated by the respective users within a database within the server.

3. The method according to claim 1, wherein the access data is transmitted encrypted.

4. The method according to claim 1, wherein the access data is transmitted at least partly via a third party network that is coupled to and accessible over the global communication network.

5. The method according to claim 1, further comprising the step of: establishing a tunnelling protocol based virtual private network (VPN) connection between the mobile unit and the server via the second Wi-Fi access point upon connection between the mobile unit and the second Wi-Fi access point, the VPN connection prohibiting access from the mobile unit to further participants being connected to the second Wi-Fi access point.

6. The method according to claim 5, wherein the server records parameters of the VPN connection including details to authentication of the user and an identity of the mobile unit.

7. The method according to claim 6, wherein all data traffic from the mobile unit is channeled through the server.

8. The method according to claim 5, wherein all data raffle from the mobile unit is channeled through the server.

9. The method according to claim 1, further comprising the step of: adding access data that is stored in the mobile unit, the access data corresponding to further connections of the mobile unit to further Wi-Fi access points, to the list of shared Wi-fi access points.

10. The method according to claim 9, wherein the step of adding access data of further Wi-Fi access points is executed upon confirmation by the user.

11. A distributed system for providing a wireless network service, the system comprising: a mobile unit connectable over a Wi-Fi connection, a server that is coupled to and accessible over a global communication network, and a first and a second Wi-Fi access point connected to the global communication network, wherein:

a) the mobile unit and the first Wi-Fi access point are operated by a first user and the second Wi-Fi access point is operated by a second user, the server is configured to store:

b) user data of at least the first and the second user, the user data comprising personal authenticity data being allocated to a user login, c) a database of shared Wi-Fi access points, the database comprising: identification data of registered Wi-Fi access points and corresponding access data allowing an encrypted wireless connection to a corresponding Wi-Fi access point, wherein the database of shared Wi-Fi access points comprises at least identification data and access data for the first and second Wi-Fi access points being operated by the first and second user, respectively, the mobile unit is configured to
d) detect the availability of a wireless service provided by the second Wi-Fi access point, to poll identification data from the second Wi-Fi access point and to transmit this identification data to the server,
e) transmit the user login of the first user to the server upon transmission of the identification data, and the server if further configured to:
f) check whether for this user login corresponding user data is stored at the server,
g) check whether the second Wi-Fi access point is in the list of shared Wi-Fi access points, and
if the checks in feature f) and g) are successful:
h) transmit access data to the mobile unit.

12. A mobile unit operated by a first user and being configured to communicate over a Wi-Fi connection with a server that is coupled to and accessible over a global communication network, the mobile unit comprising:
a memory with executable software code; and
a processor configured to access the memory and execute the executable software code to:
a) detect the availability of a wireless service provided by the second Wi-Fi access point,
b) poll identification data from the second Wi-Fi access point,
c) transmit this identification data to the server,
d) transmit the user login of the first user to the server upon transmission of the identification data,
e) receive access data from the server, and
f) connect to the second Wi-Fi access point using the access data transmitted from the server.

13. A server coupled to and accessible over a global communication network for providing a wireless network service for a mobile unit connectable to a connection, wherein the mobile unit and a first Wi-Fi access point are operated by a first user and a second Wi-Fi access point is operated by a second user, the server comprising:
a memory with executable software code;and
a processor configured to access the memory and execute the executable software code to:
a) store user data of at least the first and the second user, the user data comprising personal authenticity data being allocated to a user login,
b) store a database of shared Wi-Fi access points, the database comprising:
identification data of registered Wi-Fi access points and corresponding access data allowing an encrypted wireless connection to the respective Wi-Fi access points,
wherein the database of shared Wi-Fi access points comprises at least identification data and access data for Wi-Fi access points being operated by the first and second user,
c) receive identification data of the second Wi-Fi access point from the mobile unit,
d) receive the user login of the first user from the mobile unit upon transmission of the identification data,
e) check whether for this user login corresponding user data is stored at the server,
f) check whether the second Wi-Fi access point is in the database of shared Wi-Fi access points, and
if the checks in feature e) and f) are successful:
g) transmit access data for the second Wi-Fi access point to the mobile unit.

* * * * *